United States Patent
Papavassiliou et al.

(10) Patent No.: US 7,255,840 B2
(45) Date of Patent: Aug. 14, 2007

(54) AUTOTHERMAL REACTOR AND METHOD FOR PRODUCTION OF SYNTHESIS GAS

(75) Inventors: Vasilis Papavassiliou, Williamsville, NY (US); Minish Mahendra Shah, E. Amherst, NY (US); Thomas John Bergman, Jr., Clarence Center, NY (US)

(73) Assignee: Praxair Technology, Inc., Danbury, CT (US)

( * ) Notice: Subject to any disclaimer, the term of this patent is extended or adjusted under 35 U.S.C. 154(b) by 495 days.

(21) Appl. No.: 10/603,795

(22) Filed: Jun. 26, 2003

(65) Prior Publication Data

US 2004/0265224 A1 Dec. 30, 2004

(51) Int. Cl.
*B01J 8/04* (2006.01)
*C01B 3/34* (2006.01)

(52) U.S. Cl. ............... 422/190; 422/224; 422/191; 423/651

(58) Field of Classification Search ............... None
See application file for complete search history.

(56) References Cited

U.S. PATENT DOCUMENTS

| | | | | |
|---|---|---|---|---|
| 4,211,672 A * | 7/1980 | Sonetaka et al. | ............ | 502/66 |
| 4,381,187 A * | 4/1983 | Sederquist | ............ | 48/212 |
| 4,888,131 A | 12/1989 | Goetsch et al. | ............ | 252/373 |
| 5,102,645 A | 4/1992 | Fisher et al. | ............ | 423/415 |
| 5,554,351 A | 9/1996 | Primdahl | ............ | 423/245.3 |
| 6,471,937 B1 | 10/2002 | Anderson et al. | ............ | 423/659 |
| 6,576,203 B2 * | 6/2003 | Abe et al. | ............ | 422/191 |
| 6,921,516 B2 * | 7/2005 | Goebel et al. | ............ | 422/191 |
| 2004/0154222 A1* | 8/2004 | Burch et al. | ............ | 48/127.9 |

FOREIGN PATENT DOCUMENTS

| | | | |
|---|---|---|---|
| JP | 62125856 A | * | 6/1987 |
| WO | WO 0118451 A1 | * | 3/2001 |

* cited by examiner

*Primary Examiner*—Glenn Caldarola
*Assistant Examiner*—Jennifer A. Leung
(74) *Attorney, Agent, or Firm*—David M. Rosenblum

(57) ABSTRACT

An autothermal reactor and method for producing synthesis gas in which a heated oxygen containing stream is expanded into a mixing chamber to entrain a hydrocarbon containing stream to form a reactant stream without reaction of the oxygen and hydrocarbon contents of the streams. The reactant stream is reacted in a series of sequential catalytic reaction zones to react the hydrocarbon and oxygen contained in the reactant stream to form the synthesis gas. The sequential catalytic reaction zones are configured such that an initial partial oxidation reaction occurs that is followed by endothermic reforming reactions having ever decreasing temperatures. The sequential catalytic reaction zones in which the endothermic reforming reactions occur contain a precious metal catalyst supported on ceramic supports that have successively greater surface areas to compensate for the temperature decrease while remaining stable and without a transform in state.

8 Claims, 1 Drawing Sheet

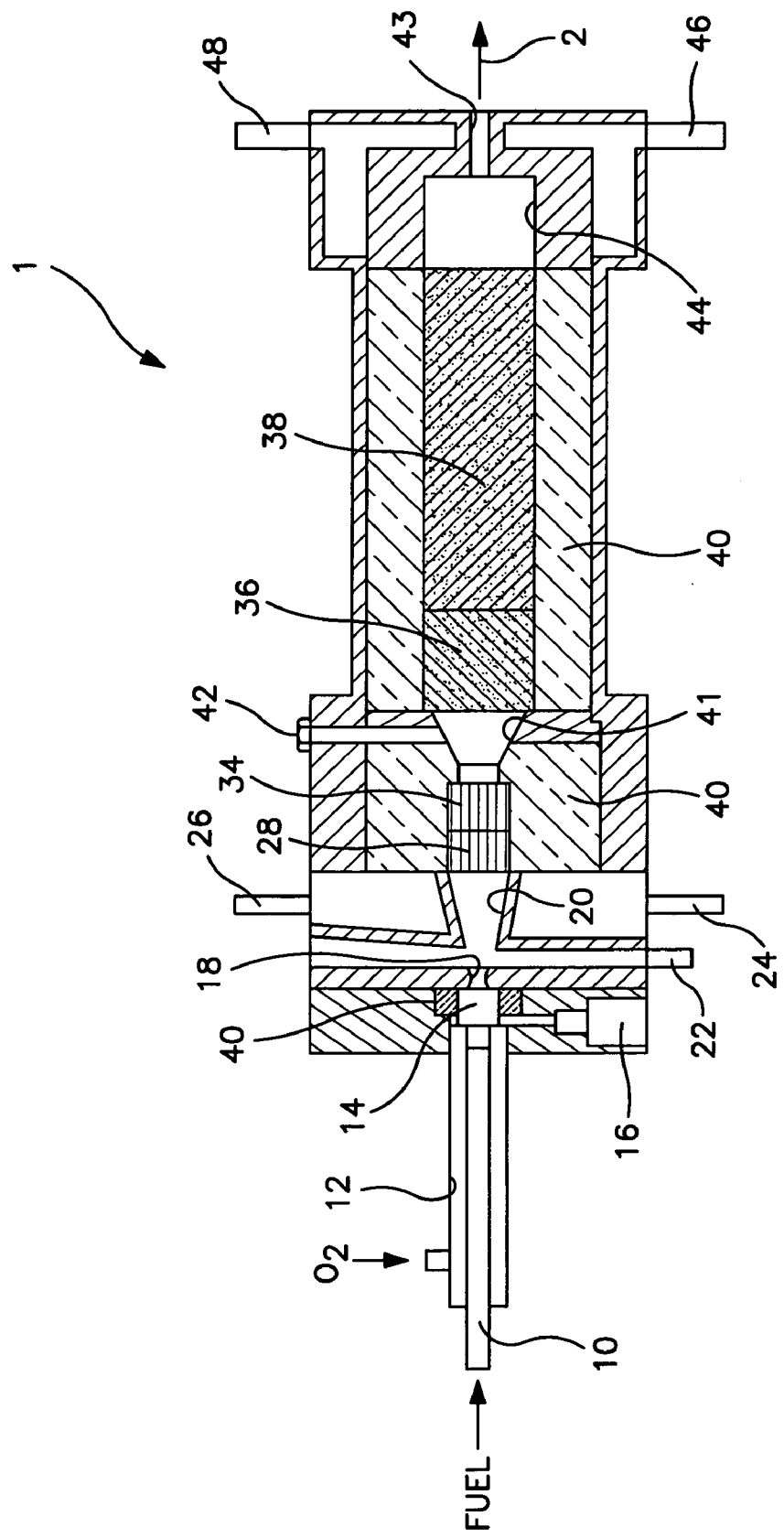

AUTOTHERMAL REACTOR AND METHOD FOR PRODUCTION OF SYNTHESIS GAS

FIELD OF THE INVENTION

The present invention relates to an autothermal reactor and method for producing a synthesis gas comprising hydrogen and carbon monoxide. More particularly, the present invention relates to such a reactor and method in which a reactant stream is produced by entraining a hydrocarbon containing stream in an oxygen containing stream that is expanded into a mixing chamber and the reactant stream is initially reacted in a partial oxidation stage and subsequently reacted in endothermic reforming stages.

BACKGROUND OF THE INVENTION

The need exists for small, safe on-site reactors to produce synthesis gas, that is a gas containing carbon monoxide and hydrogen, for use in subsequent chemical reactions or as a fuel. Synthesis gas is produced by known partial oxidation and steam methane reforming reactions or a combination of the two known as autothermal reforming.

In a partial oxidation reaction, a hydrocarbon containing stream, for instance, natural gas, oxygen and, optionally, steam are introduced into a partial oxidation reactor with the use of a specially designed burner. The oxygen is consumed at the reactor entrance. The residence time in the reactor is about 3 seconds. The overall reaction that takes place is:

$$CH_4 + 0.5O_2 = CO + 2H_2$$

The following side reactions also occur.

$$CH_4 + 2O_2 = CO_2 + 2H_2O$$

$$H_2 + 0.5O_2 = H_2O$$

$$CO + 0.5O_2 = CO_2$$

The side reactions are undesirable and reduce the product $H_2:CO$ ratio from a stoichiometric ratio of 2 to a ratio ranging from about 1.7 to about 1.8. The initial reaction is exothermic and produces heat and consequential temperature increases to above about 1300° C. The high temperatures allow the following reforming reactions to occur at the main part of the reactor:

$$CH_4 + H_2O = CO + 3H_2$$

$$CH_4 + CO_2 = 2CO + 2H_2$$

$$CO_2 + H_2 = CO + H_2O$$

The crude synthesis gas is treated in a separation system to recover a hydrogen or carbon monoxide product. Common separation systems that are employed for such purpose include: membrane separation units; MEA adsorption units, PSA, and cryogenic separation units.

In steam methane reforming, the hydrocarbon containing stream, steam and, optionally, a recycle stream, primarily containing carbon dioxide, is fed into a reactor. Commonly the reactor is formed by a bundle of tubes containing a catalyst. The tube bundle is located in a furnace and natural gas is also used as a fuel to the furnace. The hydrocarbon containing stream to be reacted is pretreated to remove sulfur which is a poison with respect to the reforming catalyst. Typically, the sulfur level in the natural gas is reduced to a part per million level before the natural gas is fed into the reactor. The following reactions take place inside the catalyst packed tubes:

$$CH_4 + H_2O = CO + 3H_2$$

$$CH_4 + CO_2 = 2CO + 2H_2$$

$$CO_2 + H_2 = CO + H_2O$$

The crude synthesis gas product from the reactor, which contains hydrogen, carbon monoxide, and water, is cooled down to avoid the re-reforming of methane from the carbon monoxide and the hydrogen. The crude synthesis gas may be treated in a variety of separation units to remove impurities or to recover a desired product such as hydrogen or carbon monoxide in a manner that is similar to that provided for in a partial oxidation reactor.

In autothermal reforming, in a first reaction zone formed by a burner, natural gas, oxygen and, optionally, steam and a recycle stream containing $CO_2$ are reacted. The reactions in this first reaction zone are as follows:

$$CH_4 + 2O_2 = CO_2 + 2H_2O \ H_2$$

The resultant intermediate product from the first reaction zone containing methane, water, and carbon dioxide, is fed to a catalyst bed below the burner where the final equilibration takes place in the following reactions:

$$CH_4 + H_2O = CO + 3H_2$$

$$CO_2 + H_2 = CO + H_2O$$

$$CH_4 + CO_2 = CO + H_2$$

The catalyst bed may be a vessel filled with catalyst as disclosed in U.S. Pat. No. 5,554,351 or a fluid bed catalyst system such as disclosed in U.S. Pat. No. 4,888,131. In the fluid bed system disclosed in the aforesaid patent, methane and steam are fed to the bottom of the fluid bed and oxygen is fed close to the bottom but inside the fluid bed. The crude synthesis gas can be treated in separation systems such as have been discussed above with respect to partial oxidation units.

The prior art reactors, such as those discussed above, are designed for large volume production of synthesis gases. They are not amenable to be modified for production on a lower scale in that they require furnaces, fluidized beds, burner, complex controls and etc. U.S. Pat. No. 6,471,937 discloses a reactor that by its very nature is capable of being utilized in lower volume applications. In this patent, two reactants are mixed by expanding one of the reactants into a mixing chamber through an orifice and entraining the other reactant to form the mixture. The mixture is formed in such a sufficiently short time that no reaction takes place between the two reactants. The reactants, once mixed, are then reacted with one another in a reaction zone. The problem with this type of reactor is that although it is desirable to use a high surface area high activity catalyst in reality if the reaction is highly exothermic the lifetime of such catalyst will be severely limited.

As will be discussed, the present invention provides a reactor and method that employs an autothermal reactor in which reactants are mixed without reaction, in a manner that can take the form outlined in U.S. Pat. No. 6,471,937, and that is designed to produce a sufficient amount of synthesis gas product to allow such reactor and method to be practically utilized for small, on-site production of synthesis gases.

SUMMARY OF THE INVENTION

The present invention provides an autothermal reactor for producing synthesis gas. A mixing chamber is provided that has an orifice to expand a heated oxygen containing stream into the mixing chamber. An inlet to the mixing chamber is located adjacent to the orifice and oriented to introduce a hydrocarbon containing stream into the mixing chamber tangentially to the heated oxygen containing stream. As a result, the hydrocarbon containing stream is entrained in the heated oxygen containing stream to mix oxygen in the heated oxygen containing stream with hydrocarbons contained in the hydrocarbon containing stream at a sufficiently rapid rate so as not to react the oxygen and the hydrocarbons. This produces a reactant stream that is made up of an unreacted mixture of the heated oxygen containing stream and the hydrocarbon containing stream.

An initial partial oxidation reaction zone having a supported partial oxidation catalyst is in communication with the mixing chamber. The initial partial oxidation reaction zone is followed by at least two endothermic reforming reaction zones heated by an exothermic reaction of the partial oxidation reaction zone to react oxygen and hydrocarbons of the reactant stream and thereby to form the synthesis gas. The at least two endothermic reforming reaction zones contain a precious metal catalyst supported on supports formed of materials that provide a greater surface area for a successive of the at least two endothermic reforming reaction zones than an initial of the at least two endothermic reforming reaction zones that directly follows the partial oxidation reaction zone. The initial and the successive of the at least two endothermic reforming reaction zones are configured to operate at ever decreasing operational temperatures such that a material making up a support of the successive of the at least two endothermic reforming reaction zones remains stable.

The use of multiple reforming zones having an increased surface area for the supported catalyst allow for faster reaction rate to take place. This foregoing feature of the invention coupled with the rapid formation of the reactant stream allows the reactor to be compact yet have a production rate of synthesis gases that is sufficient for small on-site production.

As may be appreciated, given the above discussion, it would be preferable if all of the endothermic reforming reaction zones had the increased surface area. The problem with this is that materials used in providing such increased surface area are not stable at the temperature generated by the partial oxidization reaction, for instance, titania or gamma alumina. The term "stable" when used in connection with such materials means that at high temperatures, the materials undergo a phase transition and lose their high surface area attributes. For instance, in case of gamma alumina, the material will revert to the lower surface area alpha alumina. By having low surface area initial reforming reaction zones followed by the high surface area reforming zone, the high temperatures produced at the partial oxidation zone of the system are reduced sufficiently by the time the reactant mixture reaches the high surface area reforming zone so that the life of the high surface area reforming zone is increased.

In case of a high surface area gamma alumina support, a phase transition takes place converting the same to low surface area alpha alumina above about 700° C. when un-promoted and above about 900° C. to 1000° C. when promoted. The low surface area alpha-alumina support providing a lower surface area results in lower activity. The mixing chamber can be defined by an inner surface outwardly diverging from the orifice to form a frustum of a cone. The surface outwardly diverges from the orifice at an angle calculated to inhibit re-circulation within the mixing chamber.

In any embodiment of the present invention, the partial oxidation zone can be formed by a monolithic support and the endothermic reforming zones can be formed by beds of pellets. Preferably, there are two endothermic reforming zones. The monolith can be of honeycomb configuration and the pellets of the initial of the at least two endothermic reforming reaction zones can be formed by alpha-alumina and the successive of the at least two endothermic reforming reaction zones can be formed by gamma-alumina. Alternatively the endothermic reforming zones can be formed by a ceramic or metallic monolith that is coated with the materials supporting the catalysts, for instance an alpha or a gamma-alumina layer. A ceramic heat shield of honeycomb configuration can be located between the partial oxidation reaction zone and the mixing chamber to inhibit heat transfer from the partial oxidation reaction zone to the mixing chamber.

The mixing chamber can be a primary mixing chamber. In such embodiment, a secondary mixing chamber can be situated between the partial oxidation reaction zone and the endothermic reforming zones. The secondary mixing chamber is provided with a secondary inlet to receive a recycle stream containing synthesis gas components obtained by separation of hydrogen and carbon monoxide from the synthesis gas. Preferably, the mixing chamber, the partial oxidation reaction zone and the endothermic reforming zones are in an inline relationship.

The initial of the at least two endothermic reforming reaction zones can have a surface area from between about 0.1 and about 10 $m^2$/gm. The successive of the at least two endothermic reforming zones can have a surface area from between about 5 and about 300 $m^2$/gm. The precious metal catalyst used in the endothermic reforming zones can be Pt, Rh, Ru, Pd, or Ni. The monolith for the partial oxidation reaction zone can be from a ceramic doped with a partial oxidation catalyst, for instance, rhodium, platinum, ruthenium, or palladium.

In another aspect, the present invention provides a method of making a synthesis gas. In accordance with such method, a heated oxygen containing stream and a hydrocarbon containing stream are mixed to form a reactant stream. The heated oxygen containing stream and hydrocarbon containing stream are mixed at a sufficiently rapid rate such that oxygen and a hydrocarbon containing content of the hydrocarbon containing stream remain unreacted in the reactant stream. The oxygen and said hydrocarbon content are autothermally reacted within the reactant stream in an initial partial oxidation reaction followed by at least two subsequent endothermic reforming reactions to form the synthesis gas. The at least two endothermic reforming reactions are sustained with heat generated from said partial oxidation reaction and by supported catalyst supported on supports. The supports are formed of materials that provide a greater surface area for a successive of the supports supporting the catalyst involved in a successive of the at least two endothermic reforming reactions than an initial of the supports supporting the catalyst involved in an initial of the at least two endothermic reforming reactions that directly follows the partial oxidation reaction. The initial and the successive of the at least two endothermic reforming reactions are operated at ever decreasing operational temperatures such that a material making up the successive of the supports remains stable.

The heated oxygen containing stream and the hydrocarbon containing stream can be mixed in a mixing chamber by expanding the heated oxygen containing stream into the mixing chamber through an orifice and tangentially introducing the hydrocarbon containing stream into the mixing chamber such that the hydrocarbon containing stream is entrained in the oxygen containing stream. The oxygen containing stream after expansion can have a supersonic velocity and the hydrocarbon containing stream can have a subsonic velocity.

The partial oxidation reaction can occur in a temperature from between about 800° C. and about 1400° C. and the initial of said at least two endothermic reforming reactions occurs in a temperature range from between about 1000° C. and about 1200° C. and the subsequent of the at least two endothermic reforming reactions occurs in a subsequent temperature range of between about 700° C. and about 1000° C.

A recycle stream containing synthesis gas components obtained by separation of hydrogen and carbon monoxide from the synthesis gas can be introduced into the endothermic reforming reaction zones.

BRIEF DESCRIPTION OF THE DRAWING

While the specification concludes with claims distinctly pointing out the subject matter that Applicants regard as their invention, it is believed that the invention will be better understood when taken in connection with the accompanying drawing in which the sole FIGURE is a schematic, sectional view of a reactor for carrying out a method in accordance with the present invention.

DETAILED DESCRIPTION

With reference to the FIGURE, a reactor 1 is illustrated that is designed to produce a crude synthesis gas stream 2.

Reactor 1 is provided with a fuel injector tube 10 and a coaxial, outer oxygen passage 12 which are in communication with a thermal mixing chamber 14 in which the fuel is ignited and burns in the presence of the oxygen. Ignition is initiated by a spark plug 16. Combustion takes place under fuel lean conditions such that a resultant heated oxygen mixture is produced that by in large contains oxygen and also combustion products produced by combustion of the fuel.

It is to be noted that it is important for there to be complete combustion of the fuel being used to heat the oxygen in the oxygen containing stream so that a flame is not present in the heated oxygen containing stream upon introduction into a mixing chamber 20 (to be discussed). The presence of a flame within mixing chamber 20, indicating incomplete combustion of the fuel, will promote pre-ignition and stabilize combustion in the mixing chamber 20. This is counter productive and undesirable for partial oxidation. The prevention of flame formation can be accomplished by moving fuel injector tube 10 within outer oxygen passage 12 such that it is recessed within outer oxygen passage 12 a sufficient distance from orifice 18 to ensure complete combustion of the fuel within thermal mixing chamber 14. The required degree of recess can be rapidly determined by simply moving fuel injector tube 10 within outer oxygen passage 12 until complete combustion is assured.

It is understood that other means of preheating the oxygen can be employed. For example, the oxygen can be preheated by heat exchange with crude synthesis gas stream 2 or in a separate furnace in which heat is generated either electrically or by utilizing heat from a combustion process, or waste heat from another process stream.

A heated oxygen containing stream composed of the heated oxygen mixture is introduced into mixing chamber 20. Mixing chamber 20 is operable to mix hot oxygen in the heated oxygen containing stream and the hydrocarbons in a hydrocarbon containing stream to form a high temperature reactant mixture comprising the heated oxygen and hydrocarbons. As will be discussed, the method of forming the reactant mixture involving the rapidly mixing of the oxygen and the hydrocarbons and the design of the mixing chamber 20 itself acts to prevent reaction of the oxygen and hydrocarbons within the reactant mixture while in mixing chamber 20.

The rapid mixing in mixing chamber 20 is accomplished by expelling the heated oxygen containing stream from thermal mixing chamber 14 through an orifice 18 that acts to expand the heated oxygen containing stream. The heated oxygen containing stream entrains the hydrocarbons contained within the hydrocarbon containing stream. The hydrocarbon containing stream is introduced into mixing chamber 20 through a tangential inlet 22 that is located adjacent the orifice 18. Although only one tangential inlet 22 is illustrated, there are multiple inlets such as tangential inlet 22, preferably eight radial inlets that are equally spaced at 45° from one another. Preferably, the heated oxygen containing stream enters mixing chamber 20 with an oxygen purity of about 87% by volume, a temperature in a range of between about 1300° F. and about 3200° F., and a velocity in a range of between about mach 1.05 and about mach 2. Subsonic velocities could be used but would produce less rapid mixing.

Orifice 18 is preferably fabricated from 316 L stainless steel, with a thickness of about 0.5 inches, a rocket style rounded entrance, a straight throat and a diverging angle to the nozzle exit designed to produce supersonic velocities. The computation of the appropriate diverging angle is well known to those skilled in the art and depends on the pressure differential across the orifice and desired velocity and is typically less than about 3 degrees.

The pressure in the thermal chamber 14 is at least 1.2 times, preferably at least 1.5 times and more preferably at least 2 times the pressure in the mixing chamber 20.

As mentioned above mixing chamber is preferably designed to inhibit reaction of the oxygen and the hydrocarbons. Such design includes forming mixing chamber 20 in the shape of a frustum of a cone with sides that outwardly diverge from an apex at which the hydrocarbon containing stream is tangentially introduced through tangential inlets 22. Preferably, the sides of mixing chamber 20 diverge at an angle of about 10 to 20 degrees with the apex of the cone which is closest to the thermal nozzle sized at 1.5 times the largest thermal nozzle diameter to be used. This is to minimize the recirculation of hot gases and thereby help prevent the unwanted reaction within mixing chamber 20. Water cooling is also provided to draw off heat from the surface to avoid overheating of the surface of mixing chamber 20. Water is circulated through reactor 1 to draw off heat from mixing chamber 20 through a surrounding water passage having a water inlet 24 and outlet 26. Reaction is also avoided in mixing chamber 20 due to its short length which acts to reduce the residence time of the reactant flowing within mixing chamber 20. Preferably, the length of mixing chamber 20 is sized such that the reactant containing gas mixture will move through it is less than 3 milliseconds.

Preferably, the resultant reactant stream flows from mixing chamber 20 into a honeycomb monolith 28 formed of a ceramic, preferably Alumina. Honeycomb monolith 28 acts as a heat shield to minimize radiant heat loss from subsequent catalytic reaction zones to be discussed hereinafter back to the mixing chamber 20. The reactant stream from mixing chamber 20 expands to the diameter of the honeycomb monolith 28 and flows straight through it for another millisecond.

The reactant stream then enters a partial oxidation zone 34 which can be from a ceramic doped with a partial oxidation catalyst. The catalytic doped ceramic monolith can be made of a foam or have straight channels in a honeycomb arrangement. In case of foam, the pore size is preferably between about 1 and about 4 millimeters in diameter. Rhodium, platinum, ruthenium or palladium are preferred catalysts for synthesis gas production. Rhodium is the most preferred and is preferably present within the monolith in an amount of between about 0.5 percent and about 5. percent by weight. If a foam is used, the foam can be either a yttria stabilized zirconia and alumina (YZA) or about 99% alumina.

Partial oxidation zone 34 is the highest temperature zone in the reactor. Most of the oxygen will be reacted in this zone. Residual oxygen will be less than about 10% by dry volumetric gas analysis. The reaction of the oxygen and hydrocarbon gases is exothermic initially and forms some complete products of combustion such as carbon dioxide and water and also some amount of carbon monoxide and hydrogen. The heat generated by the oxidation reactions in partial oxidation zone 34 is then available to drive endothermic reforming reaction of the fully oxidized species and methane to carbon monoxide and hydrogen. The reforming reaction takes place in sequential, second and third endothermic reforming reaction zones 36 and 38.

The residence time of the reactants within partial oxidation zone 34 is preferably from between about 0.1 and about 2 milliseconds, the temperature is between about 800° C. and about 1400° C., more preferably between about 1000° C. and about 1370° C., and the pressure is preferably about 1.5 to about 30 atm absolute.

Endothermic reforming zone 36 can be formed by alpha alumina pellets doped with platinum. The alpha alumina pellets may be spherical or cylindrical and have an effective diameter of between about 3 mm and about 100 mm. Preferably endothermic reforming reaction zone 36 has a diameter to length ratio of between about 5 and about 2 and the residence time in this stage is preferably between about 0.5 and about 2 milliseconds. Alpha alumina is not temperature sensitive and therefore, can operate at high temperatures.

The next sequential endothermic reforming reaction zone 38 operates at a lower temperature than endothermic reforming reaction zone 36 due to the fact that some heat generated in partial oxidation reaction zone 34 has been consumed in endothermic reforming reaction zone 36. In this regard, the operating temperature and pressure of endothermic reforming reaction zone 38 is preferably between about 700° C. and about 1000° C. and about 1.5 to 30 atm, respectively. The operating temperature of endothermic reforming reaction zone 36 is preferably between about 1000° C. and about 1200° C.

Endothermic reforming reaction zone 38 takes advantage of the heat consumption of endothermic reforming reaction zone 36 by utilizing a material for the support that is designed to provide a greater surface area for reaction than endothermic reforming reaction zone 36. Endothermic reforming reaction zone 38 preferably consists of a platinum catalyst, between about 0.5% and about 5% by weight, on a gamma alumina support preferably in the form of 3 to 100 mm diameter spherical pellets. The support provides a surface area from between about 5 and about 300 m$^2$/gm. This is to be compared with the surface area provided by the support of endothermic reforming reaction zone 36 which is preferably between about 0.1 and about 10 m$^2$/gm. In addition, endothermic reforming reaction zone 38 is also sized to produce a longer residence time for the reactants than endothermic reforming reaction zone 36, namely, between about 5 and about 20 milliseconds.

Reactor 1 is an autothermal reactor since heat generated by the partial oxidation reaction drives the endothermic reforming reactions. The inline relationship of the aforesaid reaction zones helps to maximize heat utilization. Available heat utilization is also increased due to the use of ceramic insulation 40 which is provided radially outward from honeycomb monolith 28, partial oxidation zone 34 and endothermic reforming reaction zones 36 and 38. In this regard insulation 40 preferably has a thickness from between about 6 and about 12 inches and is advantageously a bubble form of tabular alumina castable refractory.

Reactor 1 utilizes steel construction outside of the insulation 40 to form a pressure vessel strong enough to contain the operating pressure plus a safety margin typically three to five times the operating pressure.

The reactant stream, prior to entering endothermic reforming reaction zone 36 can be bolstered with a recycle stream introduced into secondary mixing chamber 41 through an inlet 42. The recycle stream is a by-product of downstream purification units used in the manufacture of a synthesis gas, hydrogen or carbon monoxide products. If the recycle stream is free of hydrogen it may be added to the mixing chamber 20. However if the recycle stream contains hydrogen it is not desirable to add it to mixing chamber 20 due to possibility of homogeneous ignition of the hydrogen with the hot oxygen. The recycle stream besides recovering unreacted hydrocarbons such as methane, cools the reactant stream from partial oxidation zone 34. The recycle stream, however, may be heated to reduce the cooling effect; provided, however, the temperatures and residence times are controlled and certain materials for reactor 1 (e.g. high nickel containing alloys) are avoided that will favor the re-reforming of carbon monoxide and hydrogen if present in the recycle stream.

The ratio of the recycle to the hydrocarbon that is fed to the mixing chamber is preferably no greater than about 3. The recycle stream may contain hydrogen, carbon monoxide, carbon dioxide, and methane. None of the foregoing constituents within the reactant stream is present in an amount that is more than 50% by volume. The hydrogen content is preferably between about 5% and about 50% by volume. The carbon monoxide content is preferably between about 10% and about 30% by volume. The carbon dioxide content is preferably between about 1% and about 20% by volume and the methane content is preferably between about 1% and about 10% by volume.

The resultant crude synthesis gas stream 2 should be quenched quickly after exiting endothermic reforming reaction zone 38 so that the temperature is less than about 800° F. and preferably less than about 500° F. Such quenching can be accomplished by expanding the crude synthesis gas stream 2 through an expansion nozzle 43 in communication with a water cooled chamber 44 surrounded by a water passage having a water inlet 46 and a water outlet 48.

Although not illustrated, the pellets making up endothermic reforming reaction zone 38 can be held in place relative to water cooled chamber 44 by a wire mesh, ceramic honeycomb structure or the like. It is to be noted that such cooling could be effected more slowly by heat exchange to one of the incoming process gas streams to preheat it or by heat exchange with water to generate steam.

Crude synthesis gas stream 2 may then be introduced into a separation system to produce hydrogen and carbon monoxide products or a synthesis gas product containing hydrogen and carbon monoxide. The separation system maybe a membrane, a cold box, a pressure swing adsorption unit, an amine $CO_2$ separation unit or a combination of the four. As may be appreciated, in any such separation systems, carbon dioxide and methane or other hydrocarbon content that is left unreacted will be separated. This separated content is preferably recycled.

The following examples are set forth for purposes of illustrating operation of reactor 1 and not for any purposes of limitation. These examples illustrate the operation of Reactor 1 with propane, propane and recycle, natural gas, and natural gas with recycle.

EXAMPLE 1

Reactor 1 was constructed with a partial oxidation zone 34 formed of a catalytic monolith as described above, an endothermic reforming reaction zone 36 of approximately 30 cm$^3$ in volume and having a 1% by weight rhodium on alpha alumina cylindrical pellets and a subsequent endothermic reforming reaction zone 38 containing approximately 270 cm$^3$ of platinum, between about 0.5% and about 1% by weight on gamma alumina spherical pellets of about 3 mm. diameter. A nozzle diameter of 16 mm was used for orifice 18. The orifice 18 was fed with about 101 scfh oxygen and about 3 scfh of propane. An additional amount of about 65 scfh of propane was added to the mixing chamber 20. The mixture was reacted over the monolith forming partial oxidation zone 34 without passage to a subsequent endothermic reforming reaction zone. The reactor effluent was cooled to condense water and then analyzed. The composition of the dry product gas was as follows:

| | gas | | | | | | | | | | |
|---|---|---|---|---|---|---|---|---|---|---|---|
| | $CO_2$ | $C_3H_6$ | $C_3H_8$ | $C_2H_2$ | $C_2H_4$ | $C_2H_6$ | $CH_4$ | $CO$ | $H_2$ | $O_2$ | $N_2$ |
| mole fraction | 0.826 | 0.0288 | 0.1412 | ND | 0.4527 | 0.035 | 4.2107 | 39.425 | 53.393 | 0.482 | 0.558 |

EXAMPLE 2

Reactor 1 was constructed in the manner outlined above with respect to Example 1. The orifice 18 was fed with about 122 scfh oxygen and about 3 scfh propane. An additional amount of about 64 scfh of propane was added to the mixing chamber 20. About 151 scfh of a recycle gas stream containing on a per volume basis: about 1.15% carbon dioxide, about 41.49% hydrogen, about 5.21% methane and the balance carbon monoxide was introduced to the secondary mixing chamber 30. The reactor effluent was cooled to condense water and then analyzed. The resultant composition of the product gas was as follows.

| | gas | | | | | | | |
|---|---|---|---|---|---|---|---|---|
| | $CO_2$ | $C_3H_6$ | $C_3H_8$ | $C_2H_2, C_2H_4, C_2H_6$ | $CH_4$ | $CO$ | $H_2$ | $O_2$ |
| mole fraction % | 1.00 | 0.02 | 0.04 | Not Detectable | 0.33 | 42.6 | 54.8 | 0.42 |

EXAMPLE 3

Reactor 1 was constructed in the manner outlined above with respect to Example 1 except that orifice 18 had a diameter of about 22 mm. The following table summarizes the experimental feed conditions.

| $O_2$ to orifice 18 (scfh) | Natural Gas to orifice 18 (scfh) | Natural Gas to mixing chamber 20 (scfh) |
|---|---|---|
| 100.0 | 10.0 | 198 |

The resultant crude synthesis gas stream 2 was cooled to condense water and then analyzed. The composition of the product gas was as follows.

| | gas | | | | | | | | |
|---|---|---|---|---|---|---|---|---|---|
| | $H_2$ | $CO_2$ | $C_2H_4$ | $C_2H_6$ | $C_2H_2$ | $O_2$ | $N_2$ | $CH_4$ | $CO$ |
| mole fraction % | 58.37 | 4.97 | ND | 0.05 | ND | ND | 0.99 | 9.34 | 26.15 |

EXAMPLE 4

A reactor 1 was constructed in the manner of example 1 with an orifice 18 of about 16 mm. Orifice 18 was fed with oxygen and natural gas. In addition natural gas was added to the mixing chamber 20. A recycle gas stream containing on a volume basis: about 1.15% carbon dioxide, about 41.49% hydrogen, about 5.21% methane and the balance carbon monoxide was added between the partial oxidation zone 34 and the endothermic reforming zone 36. The following table summarizes the experimental feed conditions.

| Oxygen to orifice 18 (scfh) | Natural Gas to orifice 18 (scfh) | Natural Gas to mixing chamber 20 (scfh) | Recycle stream (cfh) |
|---|---|---|---|
| 100 | 2.8 | 195 | 201 |

The crude synthesis gas stream 2 was cooled to condense water and then analyzed. The composition of the crude synthesis gas stream 2 was as follows:

| | \multicolumn{8}{c}{gas} |
|---|---|

| | $H_2$ | $CO_2$ | $C_2H_4$ | $C_2H_6$ | $O_2$ | $N_2$ | $CH_4$ | CO |
|---|---|---|---|---|---|---|---|---|
| mole fraction % | 51.50 | 4.02 | 0.0346 | 0.0523 | 0. | 0.8531 | 9.9125 | 32.74 |

As may be appreciated by those skilled in the art, while the present invention has been discussed relative to a preferred embodiment, numerous, changes, additions, and omissions can be made without departing from the sprit and scope of the present invention as set forth in the following appended claims.

We claim:

1. An autothermal reactor for producing synthesis gas comprising:

a primary mixing chamber having an orifice to expand a heated oxygen containing stream into said mixing chamber and an inlet located adjacent to said orifice and oriented to introduce a hydrocarbon containing stream into the mixing chamber tangentially to said heated oxygen containing stream such that said hydrocarbon containing stream is entrained in said heated oxygen containing stream to mix oxygen in said heated oxygen containing stream with hydrocarbons contained in said hydrocarbon containing stream at a sufficiently rapid rate so as not to react the oxygen and the hydrocarbons, thereby to produce a reactant stream made up of an unreacted mixture of the heated oxygen containing stream and the hydrocarbon containing stream;

an initial partial oxidation reaction zone having a supported partial oxidation catalyst on a monolithic support, said initial partial oxidation reaction zone in communication with said mixing chamber and followed by at least two endothermic reforming reaction zones heated by an exothermic reaction of said partial oxidation reaction zone to react the oxygen and the hydrocarbons of said reactant stream and thereby to form said synthesis gas;

a secondary mixing chamber situated between said partial oxidation reaction zone and said at least two endothermic reforming zones, said secondary mixing chamber having a secondary inlet to receive a recycle stream containing synthesis gas components obtained by separation of hydrogen and carbon monoxide from said synthesis gas; and the at least two endothermic reforming reaction zones formed of beds of pellets containing a precious metal catalyst supported on supports formed of different materials that provide a greater surface area for a successive of the at least two endothermic reforming reaction zones than an initial of the at least two endothermic reforming reaction zones directly following the partial oxidation reaction zone, the initial and the successive of the at least two endothermic reforming reaction zones configured to operate at ever decreasing operational temperatures such that a material making up a support of the successive of the at least two endothermic reforming reaction zones remains stable.

2. The reactor of claim 1, wherein:

said mixing chamber is defined by an inner surface outwardly diverging from said orifice to form a frustum of a cone; and said surface outwardly diverging from said orifice at an angle calculated to inhibit re-circulation within said mixing chamber.

3. The reactor of claim 1, further comprising a ceramic heat shield of honeycomb configuration located between the partial oxidation reaction zone and the mixing chamber to inhibit heat transfer from the partial oxidation reaction zone to the mixing chamber.

4. The reactor of claim 1, wherein said monolith is of honeycomb configuration and said pellets of the initial of the at least two endothermic reforming reaction zones is formed by alpha-alumina and the successive of the at least two endothermic reforming reaction zones is formed by gamma-alumina, respectively.

5. The reactor of claim 1, wherein said mixing chamber, said partial oxidation reaction zone and said at least two endothermic reforming zones are in an inline relationship.

6. The reactor of claim 1, wherein the initial of said endothermic reforming reaction zones has a surface area from between about 0.1 and about 10 $m^2/gm$ and the successive of the at least two endothermic reforming zones has surface areas from between about 5 and about 300 $m^2/gm$.

7. The reactor of claim 1, wherein said precious metal catalyst is Pt, Rh, Ru, Pd, or Ni.

8. The reactor of claim 1, wherein the monolithic support is formed from a ceramic doped with a partial oxidation catalyst.

* * * * *